United States Patent [19]

Sinha et al.

[11] 4,317,105
[45] Feb. 23, 1982

[54] CONDITION INDICATING DEVICE FOR WHEELED VEHICLE SHOCK ABSORBERS

[75] Inventors: Brajnandan Sinha, S-951, 47 Luleå, Sweden; Sven-Erik Tiberg, Kaptensgatan, Sweden

[73] Assignee: Brajnandan Sinha, Lulea, Sweden

[21] Appl. No.: 144,971

[22] Filed: Apr. 30, 1980

[30] Foreign Application Priority Data

May 2, 1979 [SE] Sweden ............................. 7903814

[51] Int. Cl.³ ...................... G01M 17/04; G08B 21/00
[52] U.S. Cl. .................................. 340/52 R; 73/503; 73/593; 307/10 R; 307/121; 340/683
[58] Field of Search ................. 340/52 R, 683; 307/9, 307/10 R, 117, 121; 73/503, 526, 593

[56] References Cited

U.S. PATENT DOCUMENTS

| | | | |
|---|---|---|---|
| 3,455,149 | 7/1969 | Foster et al. ..................... | 340/683 X |
| 3,744,321 | 7/1973 | Hauge ........................... | 340/52 R X |
| 3,921,945 | 11/1975 | Swain ............................. | 340/683 X |
| 3,937,152 | 2/1976 | Nilsson et al. ................... | 340/683 X |
| 4,209,779 | 6/1980 | Beck et al. ....................... | 340/683 |

FOREIGN PATENT DOCUMENTS 1483231 of 0000 United Kingdom .
1508527 of 0000 United Kingdom .

Primary Examiner—John W. Caldwell, Sr.
Assistant Examiner—Joseph E. Nowicki
Attorney, Agent, or Firm—Cushman, Darby & Cushman

[57] ABSTRACT

According to the invention, an accelerometer (G) is attached on the spring suspension (U) of the wheel (H) in question and capable upon passing of the vehicle over road irregularities to emit a decaying A.C. signal (S) with information on the oscillations of the axle (A) and the damping of the tire. After integration in an integrator (I) the signal is a measure of the difference between the damping of the shock absorber at expansion and at compression. This signal is compared in a comparator (K) with a reference signal ($V_{ref}$) for the permissible damping difference and results in alarm (L) upon achieving said difference.

4 Claims, 1 Drawing Figure

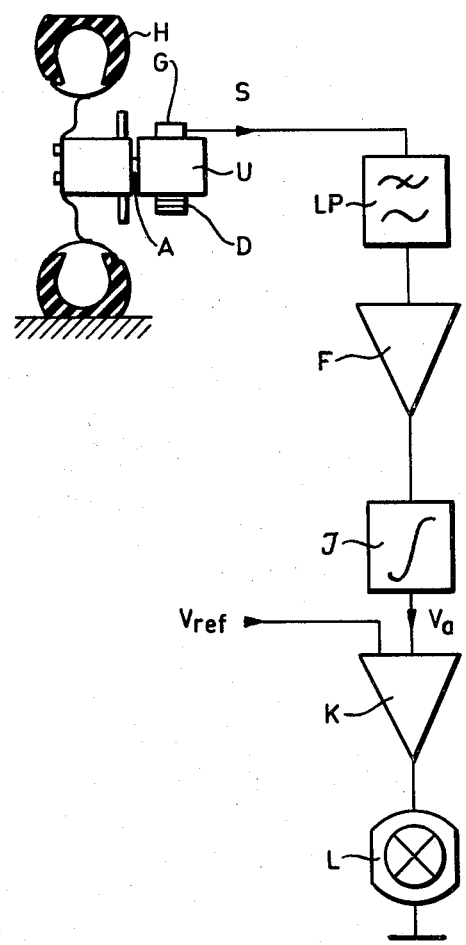

CONDITION INDICATING DEVICE FOR WHEELED VEHICLE SHOCK ABSORBERS

This invention relates to a device for indicating the condition of shock absorbers of wheeled vehicles by using an acceleration-sensitive means, which is rigidly attached near the shock absorber and emits a signal resulting in indication when a predetermined acceleration value has been exceeded.

When designing shock absorbers, they are to be dimensioned so as to yield maximum damping without causing the tires at upward motion to loose road hold, and so as to damp sufficiently softly to prevent the vehicle from being bumpy at downward motion. These two criteria imply, that the shock absorber must have properties, which are different for compression and expansion. A worn absorber more and more loses its capacity of damping oscillations. As the absorber works predominantly at compression, the damping for compression consequently decreases relatively rapidly. At a new absorber the difference between the damping at expansion and at compression is great, but decreases with increasing wear. It was, therefore, desired to obtain a reliable indication of worn shock absorbers, preferably from the driver's seat.

One indication arrangement of the kind referred to above in the introductory portion is known from GB-PS No. 1 483 231. The acceleration-sensitive means there is located on the vehicle body in order to be actuated by the mechanic oscillations of the body via the shock absorber. When the maximum amplitude of the body oscillation—i.e. the first oscillation—at the passing over a distinctive road irregularity exceeds a certain value, the means becomes operative for releasing a signal to an indication circuit. Thus, the influence of the shock absorber on the first body oscillation at road bumps is measured, which renders an unsafe and gross indication.

By the present invention, however, an indication is obtained which is both safe and sensitive, and which is based on measuring the effect of the shock absorber on oscillations, which are generated in the tire surface proper and transferred to the wheel axle. In accordance therewith, the present invention is characterized in that the acceleration-sensitive means includes an accelerometer, preferably a piezoelectric element, which is rigidly attached adjacent the wheel hub and continuously measures the oscillations of the wheel axle and emits a correspondingly varying electric signal to an integrator, the output signal of which is compared in a comparator with a reference signal corresponding to the predetermined acceleration value, in order upon achievement thereof to release indication, for example lighting-up of an alarm lamp.

The invention is described in greater detail in the following, with reference to the accompanying drawing, in which an embodiment of the arrangement of the invention for indicating worn shock absorbers is illustrated.

In the drawing, a car wheel H with axle A and stationary spring suspension means U and absorber spring indicated at D is shown. The wheel load, and therewith the damping, being approximately symmetric, it is considered sufficient to carry out the measuring of the absorber behaviour at a single one of the four wheels. According to circumstances, however, it may be motivated to measure at several wheels by using identically alike measuring arrangements.

For the indication of the absorber wear, a measure of the aforesaid difference between the damping at expansion and at compression can be obtained by measuring the oscillation of the axle, in order to obtain the difference between rising and dropping speed. The axle oscillation is a measure of oscillations generated in the tire surface and depending on the tire properties (damping and natural oscillation frequency) when the vehicle passes over road irregularities. For measuring the axle oscillations influenced also by the shock absorber, an acceleration transducer G, a so-called accelerometer, is attached to the wheel suspension U. Said accelerometer may be a piezoelectric quartz element, which in the embodiment shown is mounted facing upward on the wheel suspension U, and at its free end supports a metal plate. When the base point of the piezoelectric element is accelerated at the passing of the vehicle over road irregularities, the point motion is transferred vertically via the piezoelectric element to said plate. The mass inertia of the plate opposes the acceleration motion and thereby momentarily compresses the element. The piezoelectric effect thereof results in a measurable current impulse S, which is proportional to its compression caused by the road bumps via the tire, axle and absorber spring, and the amplitude of which decays due to the damping of the axle oscillation.

The output signal S of the transducer (piezoelectric element) G is passed to a low-pass filter LP in order to eliminate disturbing shock transients in the signal. The output of the filter LP is connected to the input of an amplifier F, the output of which is connected to the input of an integrator I. The output signal $V_a$ therefrom then is a measure of the difference of the absorber and is fed to one input of a comparator K. To the second output thereof a reference voltage $V_{ref}$ is fed which corresponds to an acceptable minimum value of the absorber difference. The reference voltage $V_{ref}$ is derived from a region of the damping/frequency characteristic of the tire where the damping is changed little with the variations in the natural oscillation frequency of the tire, while the output signal $V_a$ refers to a region where the frequency dependency of the damping is high. When the signal $V_a$ in question has diminished to the reference voltage $V_{ref}$, i.e. the difference has decreased to the permissible minimum value, the comparator emits an output signal to an indicator, for example a lamp L, which preferably is mounted on the instrument panel of the car, in order to warn the driver on the poor condition of the shock absorber.

The invention is not restricted to the embodiment described above, but a great number of different modifications can be imagined within the scope of the invention. It is especially possible to use a separate voltage source for generating the reference voltage $V_{ref}$, instead of deriving it from the tire characteristic. Furthermore, instead of utilizing the reduction of the signal to the comparator down to the reference voltage for indication, the increase of the signal up to the reference voltage can be utilized. Of course, accelerometers of a kind other than piezoelectric ones can be used.

What we claim is:

1. A device for indicating the condition of shock absorbers of wheeled vehicles by using an acceleration-sensitive means, which is rigidly attached to the vehicle near the shock absorber and emits a signal which via an electronic circuit results in an indication when a predetermined acceleration value is exceeded, characterized in that the means includes an accelerometer which is rigidly attached adjacent the wheel hub for continuously measuring the oscillations of the wheel axle, induced via a shock absorber by vertical irregularities in the road, and emitting correspondingly varying electric signals to an integrator, the output signal of which is compared in a comparator with a reference signal corresponding to a predetermined unpermissable shock absorber value, in order to, upon reaching the same, release an indication, for example lighting up an alarm lamp.

2. A device as defined in claim 1, characterized in that the reference signal is derived from a relatively frequency-independent region of the damping/frequency characteristic of the tire.

3. A device as defined in claim 1 or 2, characterized in that a low-pass filter and an amplifier are inserted between the accelerometer and the integrator.

4. A device as in claim 1 wherein the accelerometer includes a piezoelectric element.

* * * * *